United States Patent [19]
Danzer et al.

[11] 3,845,481
[45] Oct. 29, 1974

[54] TARGET CONTROLLED AGC FOR SCAN RADAR NORMALIZATION

[75] Inventors: Paul M. Danzer, Norwalk; Marshall Greenspan, Fairfield, both of Conn.

[73] Assignee: United Aircraft Corporation, East Hartford, Conn.

[22] Filed: Apr. 26, 1973

[21] Appl. No.: 354,556

[52] U.S. Cl. .................. 343/7.3, 343/7 A, 343/7.4
[51] Int. Cl. ............................................ G01s 9/14
[58] Field of Search .................. 343/7 A, 7.3, 7.4

[56] References Cited
UNITED STATES PATENTS

| | | | |
|---|---|---|---|
| 2,562,309 | 7/1951 | Fredrick et al. | 343/5 R UX |
| 2,608,651 | 8/1952 | Emmett, Jr. | 325/322 |
| 2,959,781 | 11/1960 | Houston et al. | 343/17.1 R |
| 3,159,832 | 12/1964 | Cox, Jr. | 343/7.5 |
| 3,281,837 | 10/1966 | Van Hijfte | 343/7.3 |
| 3,487,406 | 12/1969 | Howard | 343/7.3 |
| 3,603,995 | 9/1971 | Howard | 343/7.3 |
| 3,718,927 | 2/1973 | Howard et al. | 343/7.3 |

*Primary Examiner*—Maynard R. Wilbur
*Assistant Examiner*—G. E. Montone
*Attorney, Agent, or Firm*—M. P. Williams

[57] ABSTRACT

In a track-while-scan radar which pinpoints a target location by comparing target return voltage summations in the early half of a range gate (E) with those in the late half of the range gate (L), and with the target return voltage summations in the port half of a multipulse azimuth gate (P) with those in the starboard half of the azimuth gate (S) normalization of target return signal strength is eliminated by using an automatic gain control (AGC) level which is chosen as the lowest value of the early, late, port and starboard target return voltage summations, thereby using only the least, track-gated portion of the target return signal within the target window in one scan to establish the level of all of the track-gated target returns (E, L, P, S) for a succeeding scan.

6 Claims, 9 Drawing Figures

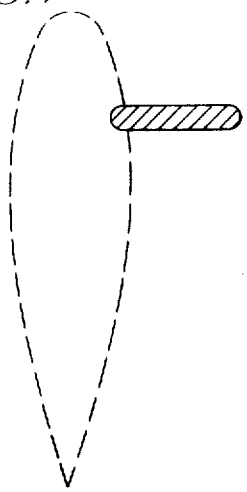
FIG. 1
FIG. 2
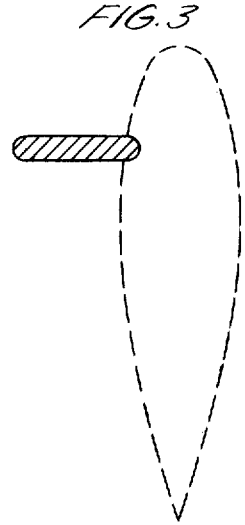
FIG. 3
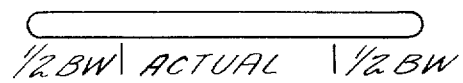
FIG. 4
½BW | ACTUAL | ½BW
FIG. 5
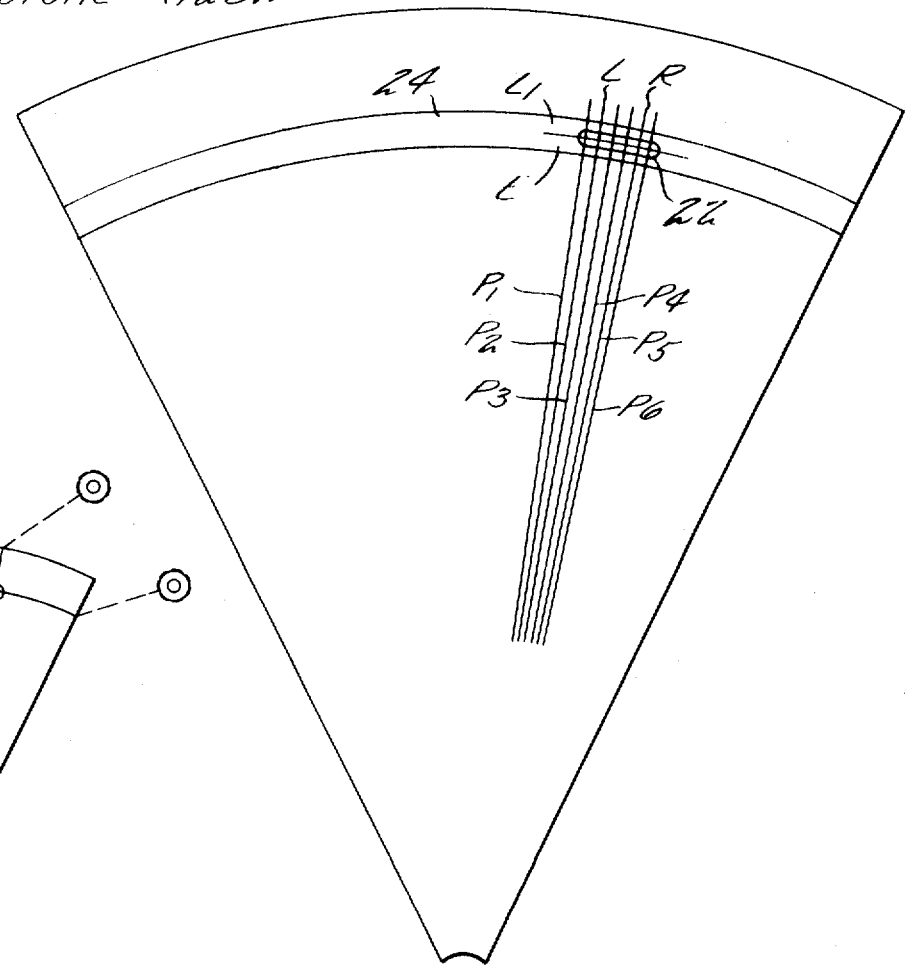
FIG. 6
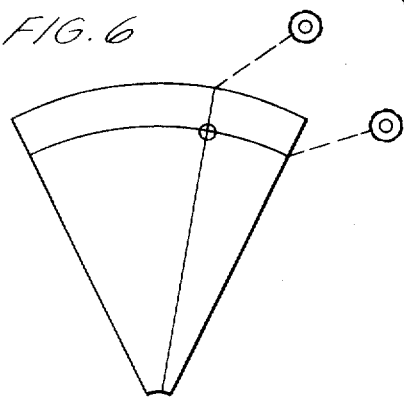

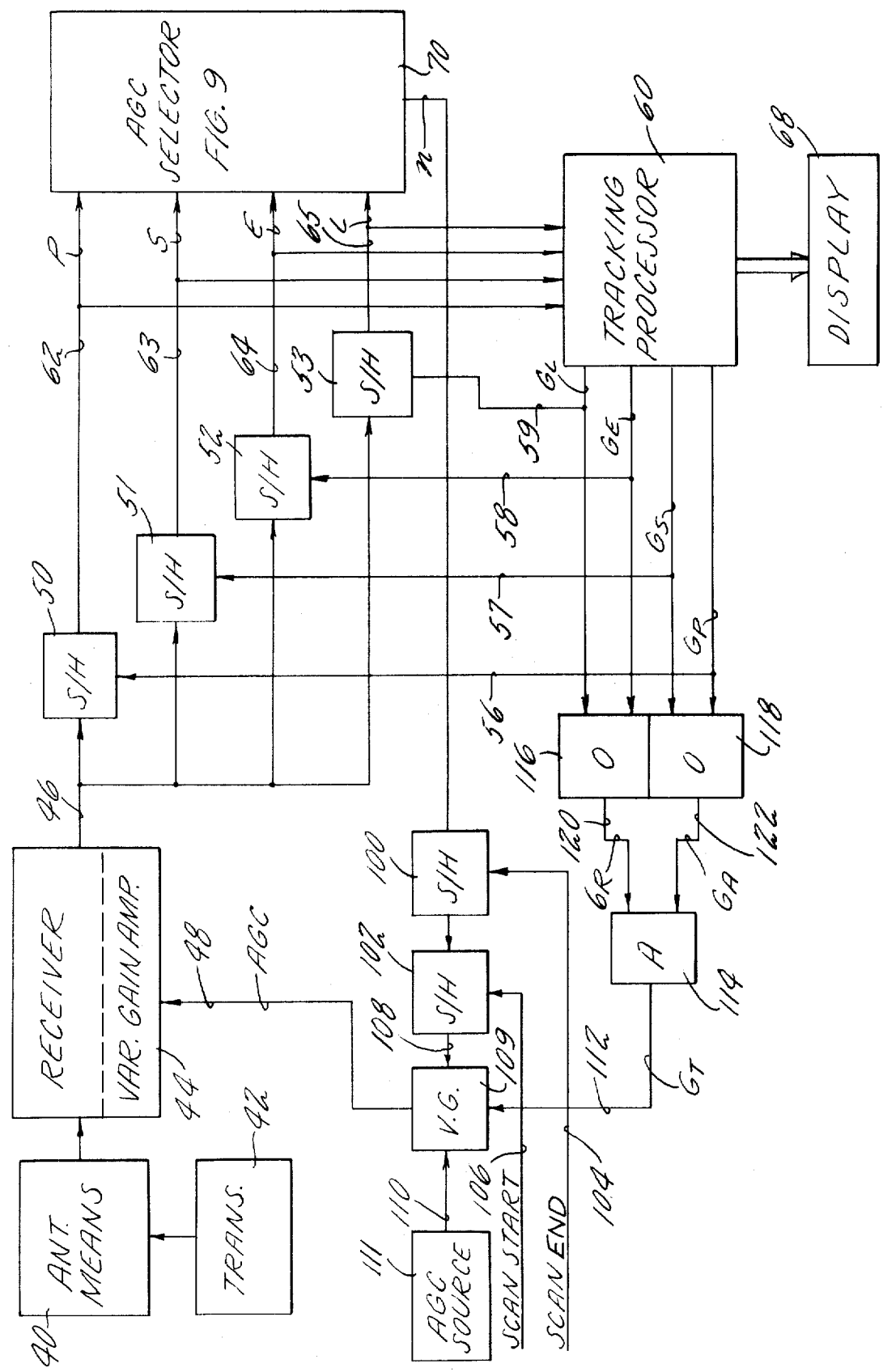

TARGET CONTROLLED AGC FOR SCAN RADAR NORMALIZATION

BACKGROUND OF THE INVENTION

1. Field of Invention

This invention relates to radar, and more particularly to the derivation of a tracking radar receiver AGC voltage level.

2. Description of the Prior Art

A now well known innovation in search or scanning radars is the track-while-scan feature which allows pinpointing the instantaneous location of a target within a rather broad beamwidth, and to a range resolution which is within the ultimate range resolution of the radar, and then by means of "sliding window" computer processing, tracks the target while the scanning of an entire area continues. The tracking is updated once in each scan.

The radar antenna scans back and forth in azimuth, thereby sweeping a segment of the atmosphere in front of the radar, or the ground ahead of and below the radar, at a frequency of several Hz, while presenting strong signal returns on a plan position indicator (PPI) cathode ray tube radar scope. The radar transmits pulses of RF energy at a pulse repetition frequency which may be on the order of one or several KHz. As each pulse propagates outwardly, the energy is reflected off various target surfaces, and for surfaces which are suitably oriented with respect to the radar, return signals are received in the order in which the targets are contacted. Thus targets at a closer range appear sooner and targets at a further range appear later; by causing the sweep of the PPI scope to start at a zero range base for each pulse, the return signals will coincide with the position on the PPI scope which indicates its relative range. Since the antenna is scanning in azimuth, each pulse goes out in a different radial direction (a different azimuthal angle).

Because the beams of search radars are very broad, and because the pulsewidths are made large so as to transmit a large amount of energy for a maximum return signal (thereby to detect even weak targets such as small aircraft or motor vehicles) the target return signals indicate targets as being much larger than they are since return signals commence at a minimum range and extend through the length of the entire pulse thereby falsely indicating a still greater range, and return signals are received from the moment that the beam pattern first contacts the target, throughout several pulses while the beam pattern scans across the target, to the last pulse when any portion of the beam intersects the target. The track-while-scan radar narrows down the location of the target to one or two pulses in azimuth and to within one range gate resolution in range by determining a particular angle in azimuth and a particular range before and after which (in each case) one half of the energy (usually taken as a summation of voltages) is received by the antenna. All of this is known in the art, and is illustrated in more detail with respect to the drawing hereinafter. A track-while-scan radar of this type is disclosed, inter alia, in Frank U.S. Pat. No. 3,182,320, assigned to the U.S. Air Force.

Tracking radars of this type known to the prior art utilize radar receivers having fixed gain or variable gain set to keep the average of the returns within the dynamic range of the receiver. Because of the physical nature of the situation, the target amplitudes may vary between 80 and 100 db which renders it difficult for the system to operate equally well with the high and low amplitude signals. In order to compensate for variations in target amplitude, the present track radars utilize data normalization, which comprises ratioing the difference of port and starboard with the sum of port and starboard, and ratioing the difference of early and late with the sum of early and late. However, it can be understood that this introduces additional complexity into the system.

SUMMARY OF INVENTION

The principal object of the present invention is to provide improved amplitude variation compensation in track radar video.

According to the present invention, a track radar receiver is provided with automatic gain control, the level of which is, in one scan or sweep, proportional to the one of the gated target return signal portions of a previous scan which has the least amplitude. In further accord with the present invention, the automatic gain control is applied to the receiver only during the tracking gate, thereby not interfering with target acquisition or other scan or search operations of the radar.

The present invention avoids the necessity of tracking gate signal normalization, thereby simplifying the apparatus in a tracking radar. In addition, utilization of the least signal as an AGC equivalent to normalization provides adaptive correction: that is, the correction factor is increased where there is a large error, and is decreased where there is a small error, which is desirable operation in a track radar. Further, the present invention results in a faster settling time of the tracking loop.

Although primarily adapted and well suited for use in track-while-scan radars, the present invention may be employed in other tracking radars.

Other objects, features and advantages of the present invention will become more apparent in the light of the following detailed description of a preferred embodiment thereof, as illustrated in the accompanying drawing.

BRIEF DESCRIPTION OF THE DRAWING

FIGS. 1-3 are simplified illustrations of a radar antenna pattern intersecting a target;

FIG. 4 is a simplified illustration of increased target size as a result of beamwidth;

FIG. 5 is a simplified illustration of a PPI scope of a track-while-scan radar, showing successive pulses thereon in a range gate;

FIG. 6 is a simplified illustration of a track while scan PPI scope with a cursor positioned over a target;

FIG. 8 is a simplified schematic block diagram of a portion of a track radar including the present invention.

DESCRIPTION OF THE PREFERRED EMBODIMENT

Figure 7:
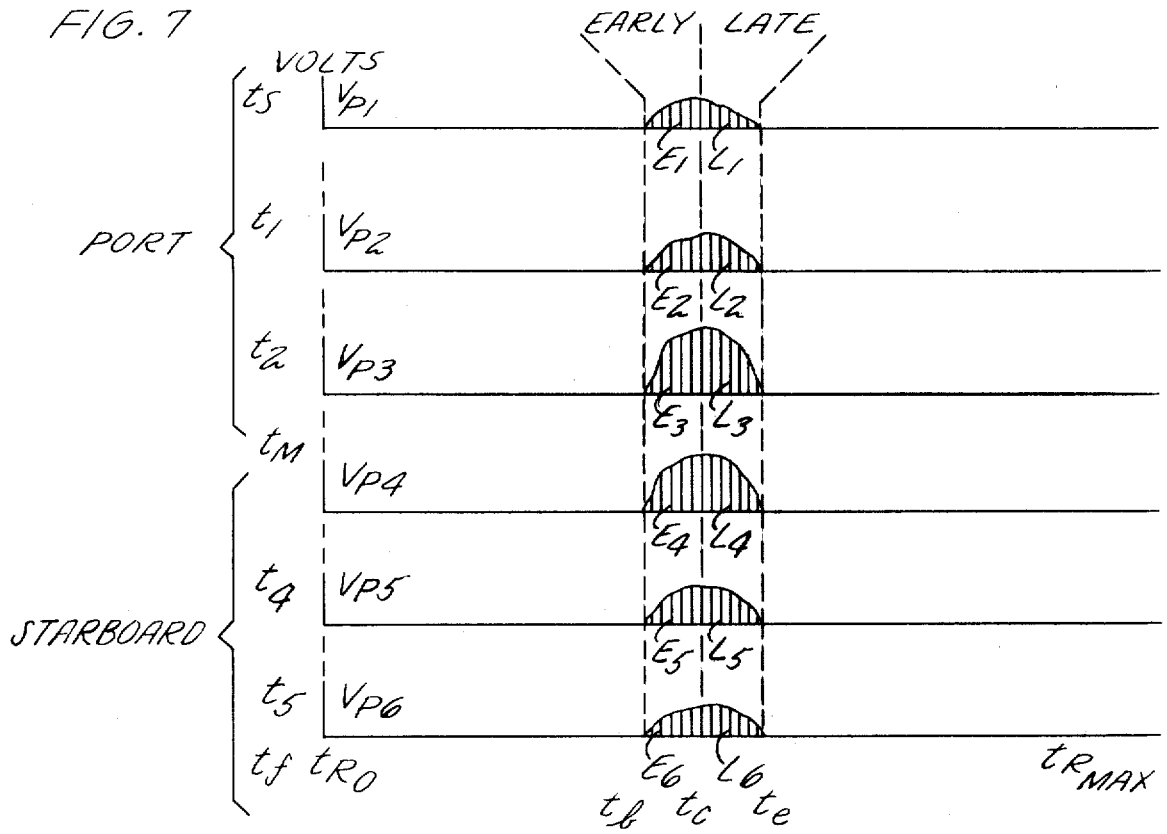
FIG. 7 is a diagram illustrating left and right and early and late target return voltage summations.

A simplified illustration of the well known nature of radar beams is presented in FIGS. 1-4. In FIG. 1, the radar beam pattern 20 is assumed to be scanning from left to right, and is seen to have just commenced impinging upon a target for which radar return signals can be received. As the antenna is caused to sweep an area being searched, within which a target is to be tracked, successive pulses from the antenna are beamed in successive azimuthal directions. Thus, several pulses later, the beam may entirely illuminate the target 22 as seen in FIG. 2. And even several pulses later (FIG. 3), when the angle in which the beam is directed has increased still further, the beam 20 still impinges on the target 22. The net result is the appearance of a target which is as wide, in azimuth, as the actual width of the target plus approximately one additional beamwidth as illustrated simplistically in FIG. 4. However, by comparing FIGS. 1 and 3 with FIG. 2, it is obvious the target return signal received at the radar will contain more energy when the beam is centered over the target (as in FIG. 2) than when the edge of the beam is just clipping the edge of the target (as in FIGS. 1 and 3). FIG. 5 is a simplified illustration of how successive pulses (P1–P6) appear at successive azimuthal positions. The sector 24 illustrates the range within which the target window is located, and the span between P1 and P6 illustrates roughly the azimuthal extent of the target window. The target is initially acquired by positioning cursors 26, 27 over the target 22 as is illustrated in FIG. 6. This may be achieved by utilizing independent cursors for range and azimuth which may be independently adjusted by respective manual controls 28, 30, or may be achieved by the light gun or joy stick apparatus disclosed in the aforementioned Frank patent. Similar, other methods of target acquisition may be utilized if desired.

Referring now to FIGS. 5 and 7, once a target is acquired, and the target window is established in both range and azimuth, the only signals responded to by the tracking processor are signals which appear within the target window as established by the range gate and the azimuth gate of the target window. Consider the pulse P1, which is the first transmitted pulse within the azimuth gate of the target window (FIG. 5). This pulse travels outwardly toward the target at the speed of light, and any target return signals resulting from the pulse impinging on the target is reflected back to the radar at the speed of light. As illustrated in FIG. 7, the pulse travels outwardly and return signals come back, with the time period between the starting time $t_s$ and a time separated therefrom by an amount dependent upon the pulse repetition frequency (PRF). Closer targets return signals to the radar sooner than farther targets. Thus within each time period ($t_s$ to $T_1$, $t_1$ to $t_2$, $t_2$ to $t_3$, etc.), the range of the target is a function of the time within which the return signal therefrom is received at the radar. These times are plotted horizontally from the time of zero range ($t_{R_0}$) through the time of maximum range ($t_{R_{max}}$). Thus for each pulse which is sent out there is a time $t_b$ where the pulse begins to impinge on the target, followed by a time $t_c$ where the pulse has reached the center of the target, followed by the time $t_e$ when the pulse reaches the end of the target. From the beginning time to the center time is herein defined as the Early gate (E) and from the center time to the end time is herein defined as the Late gate (L). As described with respect to FIGS. 1–3 and FIG. 5 hereinbefore, for successive pulses, there will be a first pulse (P1) where the target is first impinged on by the radar beam (as in FIG. 1 hereinbefore), where only little energy is reflected from the target and the target return signal voltage is small. This voltage is illustrated as $V_{p1}$ in FIG. 7. The next pulse (P2) will impinge more fully on the target so that the related voltage return signal ($V_{p2}$) will be larger. And so forth, until the beam is pointed directly at the center of the target, which may or may not occur exactly with one pulse, but which occurs somewhere near a middle time of azimuth scanning of the target. Thus on the left side of FIG. 7 are illustrated times between the start of the beam impinging on the target ($t_s$), to a time ($t_m$) when the beam is centered on the target to a time ($t_f$) where the beam is finished scanning the target. All of the pulses which are transmitted, and the corresponding return signals received, from the starting time to the middle time are herein defined as being within the Port gate (P), and all of the pulses which appear between the middle time and the finish time are herein defined as being within the Starboard gate (S).

The tracking error is determined by comparing voltage summations of Early and Late with those of Port and Starboard. Thus, in FIG. 7, one would sum VP1 in the Early period (E1) with VP2 in the Early period (E2), VP3 in the Early period (E3), VP4 in the Early period (E4), VP5 in the Early period (E5), and VP6 in the Early period (E6) so as to derive a target return voltage summation representative of signal strength in the Early gate. Similarly, the average of the voltage VP1 across the Late gate (L1) would be summed with other Late gate voltages of VP2 through VP5 through VP6 (L6), so as to derive a target return signal voltage summation for the Late gate. The Port gate voltage summation is achieved by summing the entire (Early plus Late) return signal within the azimuth window for several pulses (VP1, VP2 and VP3) and the Starboard gate target return voltage summation is determined by summing the entire average voltages of VP4, VP5 and VP6.

The description thus far is descriptive of the operation of a track-while-scan radar of the type described by Frank. In the Frank patent, however, he refers to range as Rho and azimuth as Theta; thus the Early gate herein is referred to as the early Rho gate and the Late gate herein is referred to as the late Rho gate in the Frank patent. Similarly, the gate referred to herein as Port is referred to as the early Theta gate and the gate referred to herein as Starboard is referred to as the late Theta gate in the Frank patent.

The Frank patent discloses an analog device; however, there are numerous digital devices known in the art, such as FAA air traffic control track-while-scan radars. In the Frank patent, no normalization is used. In fact, the nature of treatment of the signal prior to application to the tracking logic shown therein is not described at all. However, in the known digital track radars the return signal voltage summation comparisons are normalized in order to accommodate the fact that the numerical values of (E–L) and (P–S) vary with the strength of the target return signal in general (which in turn may be a function of the size of the target and other factors unrelated to tracking). Normalization normally takes the form of dividing the difference by the sum so that the magnitude of difference is independent of target strength, and only varies as a function of the positioning of the tracking gates with respect to the position of the target.

The present invention provides automatic gain control over the track radar receiver as a function of the video intensity within the tracking gates, and more particularly as a function of the lowest video level of the individual tracking gates (P, S, E, L). This is achieved in a system which is illustrated schematically in FIG. 8. Therein, the tracking radar, which may comprise a track-while-scan radar or some other form of tracking radar, comprises the usual antenna means 40 which is fed by an ordinary radar transmitter 42 and in turn feeds a radar receiver 44, which includes variable gain control over one or more amplification stages, whereby the video output level on a signal line 46 is a function of an AGC voltage on a line 48. The video output on the line 46 includes all of the video relating to radar return signals within the field being scanned by the antenna means 40, and in a track-while-scan radar, is of the form described with respect to FIGS. 1–7 hereinbefore. The video on the signal line 46 therefore includes the video level within each of the four tracking gates P, S, E, L, which are separated and stored in corresponding sample and hold circuits 50–53 in response to related gate signals on a plurality of corresponding lines 56–59. The gating signals on the lines 56–59 are generated in a tracking processor 60 in response to the video levels within the port, starboard, early and late tracking gates which are provided on a plurality of related lines 62–65 as the outputs of the sample and hold circuits 50–53. The tracking processor 60 produces the tracking gates on the lines 56–59 and alters the position of the cursor on a display 68 in a manner described with respect to FIGS. 1–7 hereinbefore.

Figure 9:
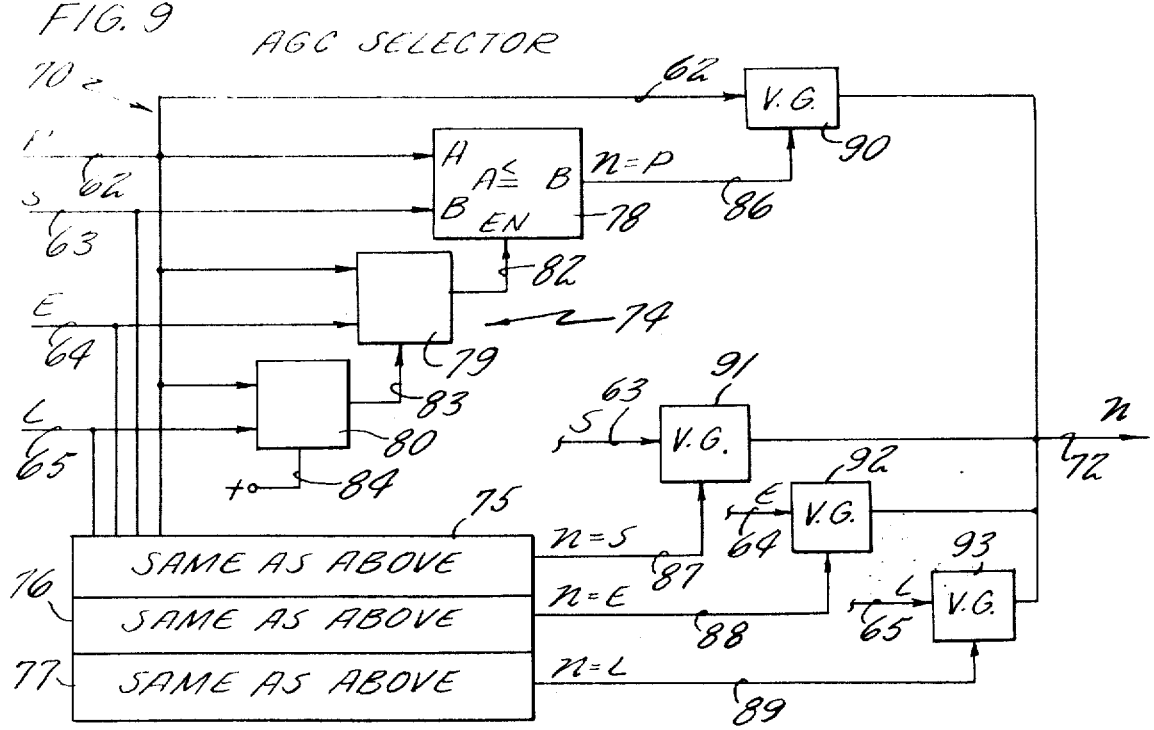
FIG. 9 is a simplified schematic block diagram of selection logic for use in the embodiment of FIG. 8.

The video level, n, which is of the least intensity within each of the four tracking gates (P, S, E, L) is selected by the AGC selector 70 of FIG. 9 and provided on a signal line 72. In FIG. 9, the lowest video level (P, S, E, L) within the tracking gates is determined by a plurality of comparison circuits 74–77 which are of the same construction. The comparison circuit 74 is shown in detail, the circuits 75–77 being of the same construction but each having a different dominant input (such as the input P being dominant in the comparison circuit 74). The comparison circuit 74 comprises three compare units 78–80 each of which compares the video level P in the port tracking gate with the video level S, E, or L in the other three tracking gates when enabled by a signal applied to an enable input on a related signal line 82–84. Each of the compare units 78–80 is such that there is an output (A ≦ B) in the case where the A input is less than or equal to the B input, which in the comparison circuit 74 is the case when the video intensity P on the line 62 is higher than the other intensity applied to the corresponding unit. If the comparison fails in the unit 80, there is no comparison signal applied on the line 83 to enable the unit 79 so that it in turn can supply no output to the unit 78 on the line 82 and therefore the unit 78 cannot provide the n = P signal on the line 86. The only way that the n = P signal can be provided on the line 86 is if the video intensity P in the port tracking gate is less than the other three video intensities, or equal to one or more of them. In the comparison circuitry 75, the video intensity S in the starboard tracking gate is compared against the other three intensities; the video intensity E is compared against the others in the circuitry 76; and the intensity L is compared against the others in the circuitry 77. Thus there is provided one or more signals on lines 86–89 indicating that the intensity within the related tracking gate is less than or equal to the other intensities. Each of these signals is applied to a corresponding video gate 90–93 to gate the related video intensity (P, S, E, L) on the corresponding lines 62–65 onto the line 72 which comprises the least video intensity among the four tracking gates. In the case where the video intensity is equal in two of the tracking gates (which is the ideal situation with perfect tracking) than two or more of the video gates 90–93 may operate; however it is assumed that these are each provided with suitable output impedance so that two or more of them can be connected to the line 72 at the same time without altering the output on the line 72 (being the same as the output of any one of them). In the case that such video gates are not desired to be used for any reason, then a simple priority circuit may be utilized so as to prevent more than one of the video gates from being gated at any one time. All of this is well within the skill of the art. It should be noted that the compare units 78 may comprise any one of a number of types of compare circuits which are readily available in the market in integrated circuit form, and may be either analog or digital, as desired. It can also be seen that standard logic minimization techniques may be applied to the mechanization in FIG. 9 to minimize the components used. The description of FIGS. 8 and 9 thus far implies analog operation, although it may equally well be implemented in a digital fashion, utilizing well known radar video digital processing techniques and apparatus.

In FIG. 8, the least gated video intensity signal, n, on the line 72 is applied to a first sample and hold circuit 100, the output of which feeds a second sample and hold circuit 102. The sample and hold circuit 100 is gated by a scan end signal on a line 104 and the sample and hold circuit 102 is gated by a scan start signal on a line 106. These signals may be derived from the antenna or the plan position indicator (PPI) scanning circuitry at the end of each scan, and at the start of the subsequent scan, in a well known fashion. This provides the ability to register in the sample and hold circuit 100 the current least track video level, n, while during this current scan the AGC voltage on the line 48 is provided as a function of the least gated video determined in the next prior scan of the radar, as stored in the sample and hold circuit 102. At the start of each scan, the value in the sample and hold circuit 100 is transferred to the sample and hold circuit 102, and that value is used to control the gain of the receiver 44 during the current scan, in which a new value, n, of the least gated video is provided to the sample and hold circuit 100.

The output of the sample and hold circuit 102 is applied to a video gate 109, on a line 108 along with a constant voltage or other standard AGC voltage applied on a line 110 from an AGC source 111. When the video gate is activated by a tracking gate signal ($G_T$) on a line 112, and causes the video gate 109 to provide a signal from the sample and hold circuit 102 to the receiver 44 over the line 48; when the tracking gate signal is not present on the line 112, then the video gate 109 will apply a constant potential from the line 110 over the line 48 to the receiver 44. The signal on the line 110 can be provided internally of the video gate, or in any other fashion; this is chosen so as to provide maximum gain to the receiver 44 so as to provide the desired, predetermined sensitivity for search or scan purposes, whereas the AGC relating to the track video is provided only within the tracking gate period. The tracking gate signal ($G_T$) from the line 112 may be provided in any suitable fashion, such as by an AND circuit 114 which in turn responds to a pair of OR circuits 116, 118, which respectively generate the range gate signal ($G_R$) on a signal line 120 and the azimuth gate signal ($G_A$) on the line 122. The OR circuits 116, 118 respond respectively to the early and late gate signals ($G_E$, $G_L$) on the lines 58, 59 and to the port and starboard gate signals ($G_P$, $G_S$) on the lines 56, 57, respectively.

It should be noted that the only elements of the present invention which differ from those in, for instance, a normal track-while-scan radar of the type illustrated in the aforementioned Frank patent, or of the type exemplified by the FAA systems, is the provision of the AGC selector 70, the sample and hold circuits 100, 102, the video gate 109, and provision of a gain control input 48 to the radar receiver 44. This apparatus provides modification to such a known tracking radar which controls the gain of the radar receiver in response to the lowest of the intensity levels within the four tracking gates (P, S, E, L).

The present invention may be implemented totally in an analog system (as exemplified by the Frank patent) or in a digital system, without in any way altering the principles of the invention. In an analog system, the sample and hold circuits may comprise capacitive storage elements with high impedance buffer amplifiers; in a digital system, they may simply comprise registers; the video gate circuit 109 may simply comprise a digital gate in a digital system. Thus, although the invention has been shown and described with respect to a preferred embodiment thereof, it should be understood by those skilled in the art that the foregoing and various other changes and omissions in the form and detail thereof may be made therein without departing from the spirit and the scope of the invention.

Having thus described a typical embodiment of our invention, that which we claim as new and desire to secure by Letters Patent of the United States is:

1. In a scanning pulse radar system having processing means providing tracking gates for automatic cursor tracking of designated targets in response to video levels of target return signals falling in said tracking gates, the improvement comprising:
   means for selecting in each scan of the radar system the lowest video level from among the video levels respectively corresponding to each of the tracking gates; and
   means responsive to said last named means for controlling the gain of the receiver of said radar system in a succeeding scan in response to the lowest video level selected during a preceding scan.

2. A tracking radar system comprising:
   means including a scanning antenna, a pulse transmitter, and a receiver having a controllable gain, for illuminating successive portions of a scanned area with a pulsed radar energy and receiving return signals reflected from targets located in said area and providing at the output of the receiver video signals representative of the target reflections;
   processing means including cursor means identifying a point within said area for providing tracking gates in range and azimuth centered about said point, said processing means adjusting the position of the point defined by said cursor means in response to video signal levels falling within said tracking gates;
   means responsive to the video signals falling within said tracking gates for selecting the lowest level video signal within said tracking gates during each scan;
   means for storing the lowest video signal selected in one scan; and
   AGC means responsive to the lowest video signal level stored in one scan for controlling the gain of said radar receiver during a succeeding scan.

3. A tracking radar system according to claim 2 wherein said AGC means comprises means responsive to the tracking gates for controlling the gain of the receiver in response to the lowest video level stored during a preceding scan only during the time coextensive with the tracking gates.

4. A tracking radar system according to claim 3 wherein said AGC means further comprises means for controlling the gain of said radar receiver to have predetermined gain during time periods exclusive of said tracking gates.

5. A tracking radar system according to claim 2 wherein said selecting means comprises a plurality of comparison circuits responsive to the video levels within the respective tracking gates for generating related signals indicative of the lowest of said video levels; and
   means responsive to said related signals for providing the lowest of said video levels to said storage means.

6. The tracking radar according to claim 2 wherein said storage means comprises a pair of storage devices in series with each other, one actuated at the end of one scan to store the lowest video level selected during said one scan, the second of said storage devices receiving the video level stored in the first of said storage devices at the start of a succeeding scan.

* * * * *